Sept. 24, 1957     T. W. FRANK     2,807,542

METHOD OF MAKING HIGH DENSITY SINTERED ALLOYS

Original Filed May 18, 1949

INVENTOR
THOMAS W. FRANK
BY
Campbell, Brumbaugh, Free & Graves
HIS ATTORNEYS

United States Patent Office 2,807,542
Patented Sept. 24, 1957

2,807,542
METHOD OF MAKING HIGH DENSITY SINTERED ALLOYS

Thomas W. Frank, New York, N. Y.

Continuation of application Serial No. 93,897, May 18, 1949. This application July 8, 1955, Serial No. 520,764

5 Claims. (Cl. 75—214)

This invention pertains to an improved method of producing from metal powders exceptionally dense alloys that have many improved characteristics and novel values and uses.

The invention also pertains to the novel products so produced.

This is a continuation of my U. S. application Serial No. 93,897, filed May 18, 1949.

One of the features of this invention is the employment of this improved method in treating a novel combination of powdered metals to produce an end alloy of high relative density which has been found to withstand high temperatures under high stresses and to resist such high temperatures and stresses for longer times than has heretofore been possible with products prepared by simple technique.

By employing this method to provide the novel high relative density alloy, entirely new and expanded fields of use have been opened and many of the long-standing desires for particular products for particular purposes have been met.

In regard to the novel process, it may be stated that a series of metal powders (preferably without other ingredients although other ingredients may be added for different purposes) are mixed and then subjected to a predetermined pressure to obtain a compact of sufficient strength to be handled easily without breaking apart. A compact of this physical strength is usually referred to as one having high green strength.

The compact thus formed is then heated to a selected temperature and is then held at or near that temperature for a time, and then the temperature is varied, either up or down, and then the temperature is raised to a second selected temperature which is above the first selected temperature, and then the compact is held near that temperature for a time, and is then cooled in any desired manner.

In practicing the improved process, it is desired that the first selected temperature fall somewhere between a temperature which would give incipient melting of the compact and a temperature about 50° C. below said incipient melting temperature. The temperature below incipient melting is sometimes called herein "initial sintering temperature." The temperature during the first holding period usually falls within the temperature of incipient melting and about 50° C. below the same. Likewise, the temperature during the second holding period is above the incipient melting temperature, and usually more than 10° C. above. This second selected temperature will be referred to hereinafter at times as the "final sintering temperature."

For the purposes of this invention, the term "temperature of incipient melting" may be defined as generally the lowest temperature (reached by a normal heating rate) at which incipient melting of a part of a powder compact—or the whole compact—takes place. It is not necessary for this incipient melting to occur throughout the entire compact. It usually is localized at the surface. Any compact having reached this temperature is generally characterized at room temperature by some distortion of shape and large surfaces grains, and possible slight evidence of surface metal flow. For any compact the temperature which first produces this condition can be determined easily by cut-and-try. After the temperature of incipient melting for a particular compact has been established, the initial sintering temperature of this improved procedure is taken at a safe lower level (usually at least 15° or more lower).

The term "normal heating rate" referred to above is defined for the purposes of this invention as an average rate at which a compact approximately ½" round and approximately ¼" thick would be raised when introduced into a furnace at operating temperature and would normally average not less than 100° C. per minute.

The practice of this improved process operates to maintain substantially the original physical configuration of the compact; or in other words, there is substantially no distortion of shape. In addition, there has been produced a substantially complete diffusion of all of the metallic ingredients and there has been a substantial completion of all shrinkage which might occur in the product.

In addition, in some cases it has been found desirable to have in the practice of the improved process a second or intermediate pressing of the product. This second pressing usually assists in the bonding and alloying of the various metal powder ingredients and assists in improving the relative density of the final product.

Another of the advantages of practicing this improved process is that excellent reproducibility of the results is readily obtained.

It is known in mixing and combining powders of various metals that in many cases it is difficult to alloy all of the desired metals together to obtain the desired end alloy. Preferred application of this novel procedure involves the use of at least one pre-alloyed metal powder in the mixture. For compositions containing chromium, it has been found advantageous to introduce the chromium content in this pre-alloyed manner. The metal chromium has a relatively high melting point and is difficult to diffuse because of some oxide films which are not readily reducible.

The improved process described herein, it will be understood, may be readily applied to many compositions of material whether there are only three or four ingredients employed, or whether there is a much larger number of ingredients employed. For instance, a composition of tungsten, chromium, cobalt and carbon is given as an example of a few number of ingredients. In addition, another example is that of combining tungsten, titanium dioxide, chromium, cobalt, carbon, molybdenum, iron, nickel and the like.

In practicing the improved invention herein, it will be understood that the sintering may be carried out in a reducing atmosphere, such as dry hydrogen, but it may also be carried out in a vacuum.

In regard to the product, it is stated that preferably the final or end product is of high relative density with many new characteristics, one very important characteristic being that it will withstand for a long time a high temperature while being subjected to high stresses. Such a novel alloy has been found to withstand a tensile stress of 25,000 p. s. i. while at a temperature of 1500° F. for a minimum time of 74 hours.

Such an improved product has many characteristics and values that have proven to be novel in the alloy field, and it has many uses. Some of the applications where high temperatures and stresses are present are found in gas turbines, superchargers and jet engines. Other important characteristics of the alloys are resistance to corrosion, resistance to wear, resistance to heat, high "red" hardness, and good reflectivity. Other uses for these alloys include small heat-resistant parts such as valve seats, cutting tools, die parts, bushings and the like.

Among the advantages derived from the use of metal powders in the preparation of these alloys (as compared to alloys containing the same elements but prepared by fusion metallurgy) are improved purity, control of composition and procedure and therefore properties, improved ductility and high tensile strength.

The compact is composed mostly of metal powders but it is, in some instances, desired to add other elements or ingredients for various purposes, such as binders, or scavengers, and the like.

In carrying out the improved invention, it is desirable to do so with the use of the smallest amount of apparatus and to be able to employ only the minimum number of steps in the process and to produce the improved product in a short period of time.

Referring now to the drawings, which illustrate diagrammatically the practice of the process of this invention:

Figure 3:
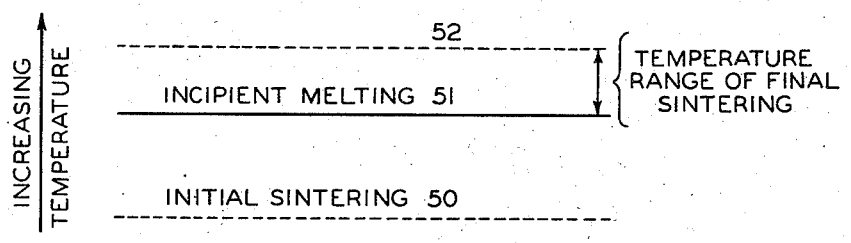
Fig. 3 illustrates the general relationship of the temperatures involved in the treatments.

In practicing this invention and referring to these diagrammatic illustrations, a mixture of material in powdered form is compacted at a pressure normally falling between 20 and 50 tons per square inch. This compact is then raised from room temperature (point 15) to a first selected temperature which will be assumed as at point 16 of Fig. 1. Normally, the time required to reach point 16 is not less than 10 minutes, although this may be varied considerably. It is then preferred to keep the compact at a substantially uniform temperature for a predetermined period of time as represented between the points 16 and 17. This period between 16—17 may properly be termed the first sintering or dwell period. It is to be understood that the temperature during the dwell period may fluctuate somewhat or it may be maintained uniformly. This period 16—17 will fall usually between high and low temperatures which are illustrated as the lines 50 and 51 of Fig. 3. This range of high and low temperatures is to be noted as having the incipient melting temperature for the high temperature and about 50° C. below for the low temperature of the range.

The time period between points 16 and 17 may vary considerably and may be as little as ten minutes. It is desired that this time period shall be sufficient to allow preliminary bonding or alloying of the metals and this will vary depending upon the ingredients of the composition and variations in the treating process, and possibly upon other conditions not now known.

Figure 1:
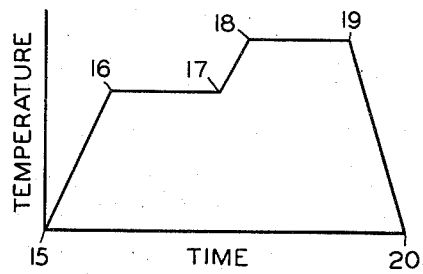
Fig. 1 illustrates a time-temperature diagram of a treatment that produces the improved alloy of exceptionally high relative density.

After proceeding through the first dwell period, then it is desired to modify or vary the temperature of the compact, and then to finally raise the temperature to a higher value. In Fig. 1, the varying of the temperature, it will be noted, amounts to an increase. This is accomplished, preferably at a slow rate, up to point 18. The time duration for this change of temperature may be, for example, 2° C. per minute, or some other rate, depending upon the composition or mixture.

This second selected temperature or final sintering temperature is normally not more than 30° C. above the incipient melting temperature. The temperature represented by point 18 of Fig. 1 is within the high and low temperature range indicated between the points 51 and 52 of Fig. 3. The exact temperature or position of point 18 may vary, depending upon the original composition of ingredients or upon any other feature.

After reaching this second selected temperature, or final sintering temperature, represented at 18, it is desired to provide a second sintering or dwell period extending to some point such as 19. The length of time for this period is variable, depending upon the constituent metals of the original mixture and the condition of bonding or alloying between the metals in the compact at this stage. Excellent results have been obtained, with substantial completion of diffusion and shrinkage, when the time from 18 to 19 has been one hour or less.

From the point 19 to point 20, which is room temperature, the compact may be cooled in any manner, dependent to some extent on the final microstructure desired. In most cases cooling in a water-jacketed furnace tube or an equivalent is satisfactory.

Figure 2:
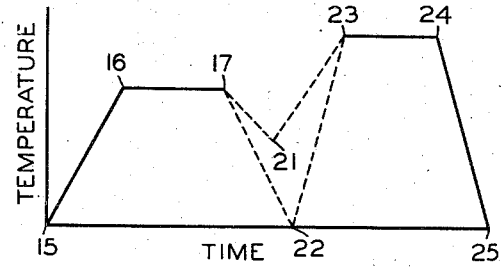
Fig. 2 is also a time-temperature diagram illustrating a modified form of temperature applications.

A variation in the improved process described herein has been found very satisfactory for producing the improved final product with its improved characteristics. Beginning at point 17 in Fig. 2, the temperature is modified by decreasing it instead of increasing as in Fig. 2. Referring to Fig. 2, the temperature may be decreased for instance, to a point 21 or even brought to point 22, which represents room temperature or to any other temperature below point 17, and then increased to a second selected temperature at a point 23 which is higher than the temperature employed between the dwell period 16—17. Procedure for the final sintering period from 23 to 24 will normally be the same as noted before in regard to the second dwell period between 18 and 19 of Fig. 1. From the point 24 the temperature may be decreased, as desired, to a point 25, which again represents room temperature.

In general, the relationship of the two sintering temperatures to incipient melting temperature and the considerations regarding the sintering periods are the same for each of the procedures.

It has been shown by the diagrams that the sintering or dwell periods 16—17 and 18—19 and 23—24 are each of substantially uniform temperatures. It will be understood these temperatures may vary to some extent, either for some special purposes or because of practical difficulties with exact control.

The bonding or alloying of the ingredients may start during the time interval between the points 15—16, and the first dwell 16—17 will normally complete the preliminary diffusion. There will be a substantially complete alloying of the ingredients before reaching the point 19 or 24. Also, any shrinkage of the product will usually have been completed before either point 19 or 24 is reached. It will be noted that these time periods depend considerably upon the type, amount, and melting points of the various ingredients, and upon desired characteristics to be had in the end product.

It will be seen in general that the improved process herein includes the steps of mixing metal powders together, preferably including pre-alloyed powder, and subjecting the mixture to a pressure, and then raising the temperature of the compact to the initial sintering temperature and maintaining the same at substantially that temperature for a predetermined time, and then varying the temperature applied to the compact, and then raising the compact to a second selected temperature, and then maintaining a substantially uniform temperature for a predetermined time, and then cooling the product to room temperature. A modification of the temperatures in the sintering or dwell periods may also be noted as above, in that the temperatures may vary within the temperature range for each dwell period, as shown between 51 and 52 in Fig. 3.

A modification of the processes represented by Figs. 1 and 2 has been found to produce final products with excellent characteristics. It is composed of the following steps: (a) Pre-pressing the mixture at approximately 25 t. s. i.; (b) pre-sintering the compact between 700° C. and 950° C., the temperature depending on composition; (c) re-pressing the compact at a pressure between 50 and 100 t. s. i.; and (d) final sintering the compact between 1100° C. and 1350° C., the temperature depending on composition and being substantially the same as that which would be employed for the other two processes.

As a result of the practice of this improved process, and its modifications, an alloy of very high relative density has been found to be resistant to high temperatures while under great stresses. Some tests of one of the improved end products have been made and the following results noted: Two specimens made in accordance with the diagram in Fig. 1 lasted 125 hours and 146 hours, respectively, under a temperature of 1500° F. and an applied tensile stress of 25,000 p. s. i.

Two examples of the improved products produced in similar manner to the procedure of Fig. 2 and in which both examples were cooled to room temperature between point 17 and 23, lasted 172 hours and 200 hours, respectively, when subjected to the same test conditions.

It will be understood that these results represent a preliminary stage of development and in no way are to be considered the maximum obtainable with the improved process or the improved products.

It may also be noted that one of the products of a few ingredients includes chromium and cobalt with tungsten and carbon. In the processing of this type of composition, it is desired to introduce the chromium and cobalt together as a pre-alloyed powder and to mix this pre-alloyed powder with tungsten and graphite powders and subject the mixture to the various steps of the method herein disclosed. The final analysis of one of these products, which is highly heat resistant, highly resistant to corrosion and of very high relative density shows the following:

| | Percent |
|---|---|
| Chromium | 22 |
| Cobalt | 52 |
| Tungsten | 25 |
| Carbon | 0.75 |

The above is one example, and other examples may be employed as desired by varying the percentages of the ingredients and their treatment.

Examples of specific applications of the procedures are given below as case I and case II, representing examples of the procedures of Figs. 1 and 2, respectively. Compacts were pressed at 50 t. s. i. from a mixture containing

| | Percent |
|---|---|
| Chromium | 21.2 |
| Cobalt | 53.1 |
| Tungsten | 24.7 |
| Carbon | 1.0 |

The carbon was introduced as graphite powder and the chromium and cobalt were introduced in pre-alloyed form.

The carbon was introduced as graphite powder and the chromium and cobalt were introduced in pre-alloyed form.

The temperature of incipient melting was determined to be approximately 1280° C.

The examples follow:

Case I

| | Hardness, Rockwell A | Density, grams/cc. |
|---|---|---|
| Sintered 2 hours at 1,265° C. in dry hydrogen. Temperature raised to 1,285° C. and held for 1 hour; fast cooling. | 71 | 9.24 |

Case II

| | Hardness, Rockwell A | Density, grams/cc. |
|---|---|---|
| Sintered 2 hours at 1,265° C. in dry hydrogen; fast cooling. | 68 | 8.82 |
| Sintered at 1,285° C. for 1 hour; fast cooling. | 71 | 9.22 |

Evidence of the importance of temperature is found in the increase in density resulting from the sintering at 1285° C., higher than the temperature of incipient melting. It might be noted also that if the second temperature in case II were 1275° C. instead of 1285° C., hardness would be R. A. 69 and density would be 8.95 g./cc.

Based on computed theoretical density, final relative density of these products is found to be 99.2 to 99.4%.

It may be desirable to vary the compositions of the above ingredients, and various products may be made as long as the final analysis of these example products falls within the following ranges:

| | Percent |
|---|---|
| Chromium | 20 to 35 |
| Cobalt | 35 to 55 |
| Tungsten | 15 to 50 |
| Carbon | 0.50 to 8.0 |

When it is desired to form a product which has additional ingredients of iron, nickel, molybdenum, and any other ingredients, such as silica, or the like, it will be understood that such special-purpose alloys may be obtained by varying the compositions so that the mixtures will show analyses which fall within the following range: chromium 10 to 90% and cobalt 90 to 10% in the pre-alloyed powder of these two ingredients; 15 to 55% iron, 10 to 30% nickel and 0.50 to 8.0% carbon, which is normally introduced into the mixture as graphite, and 5 to 35% of a pre-alloyed powder of tungsten and molybdenum. The powders of any other ingredients may be added, and the mixture subjected to the steps of the novel process herein.

It will be understood that various modifications and changes may be made in the preferred form of the invention herein, and such modifications and changes are to be understood as part of this invention, as outlined in the following claims:

I claim:

1. In the method of producing an alloy product of high relative density, the steps of preparing a mixture of approximately 24.7% tungsten powder and approximately 1.0% graphite powder, and of approximately 74.3% of a pre-alloyed powder containing approximately 28.4% chromium and approximately 71.4% cobalt; then pressing said mixture to form a compact of high green strength; heating the same to a sintering temperature of approximately 1265° C.; maintaining said compact near that temperature for not less than fifteen minutes to effect preliminary bonding of the metals in said compact; thereafter raising the temperature of said compact to approximately 1285° C.; maintaining said compact at approximately the 1285° C. temperature for about 30 to 60 minutes to practically complete the alloying of the ingredients in said compact without materially changing the physical configuration of said compact, and cooling said compact to room temperature.

2. In the method of producing an alloy product of high relative density, the steps of preparing a mixture of approximately 24.7% tungsten powder and approximately 1.0% graphite powder, and of approximately 74.3% of a pre-alloyed powder containing approximately 28.4% chromium and approximately 71.4% cobalt; then pressing said mixture to form a compact of high green strength; heating the same to a sintering temperature approximating 1265° C.; maintaining said compact near that temperature for not less than fifteen minutes to effect preliminary alloying of the metals in said compact; then lowering the temperature applied to said compact for a time period up to about 20 minutes; then raising the temperature of said compact to approximately 1285° C.; maintaining said compact at approximately the 1285° C. temperature for not less than 30 minutes to practically complete the alloying of the ingredients in said compact without materially changing the physical configuration of said compact, and cooling said compact to room temperature thereby forming a product that will withstand a stress of 25,000 p. s. i. at 1500° F. for not less than 100 hours.

3. In the method of producing an alloy product of high relative density, the steps of preparing a mixture of approximately 20% to 35% chromium powder, 35% to 55% cobalt powder, 15% to 50% tungsten powder, and 0.50% to 8.0% carbon powder; then pressing said mixture to form a compact of high green strength; heating the same to a sintering temperature of approximately 1265° C; maintaining said compact near that temperature for not less than fifteen minutes to effect preliminary bonding of the metals in said compact; thereafter raising the temperature of said compact to approximately 1285° C.; maintaining said compact at approximately the 1285° C. temperature for about 30 to 60 minutes to practically complete the alloying of the ingredients in said compact without materially changing the physical configuration of said compact, and cooling said compact to room temperature.

4. In the method of producing an alloy product of high relative density, the steps of preparing a mixture of approximately 20% to 35% chromium powder, 35% to 55% cobalt powder, 15% to 50% tungsten powder, and 0.50% to 8.0% carbon powder; then pressing said mixture to form a compact of high green strength; heating the same to a sintering temperature approximately 1265° C.; maintaining said compact near that temperature for not less than fifteen minutes to effect preliminary alloying of the metals in said compact; then lowering the temperature applied to said compact for a time period up to about 20 minutes; then raising the temperature of said compact to approximately 1285° C.; maintaining said compact at approximately the 1285° C. temperature for not less than 30 minutes to practically complete the alloying of the ingredients in said compact without materially changing the physical configuration of said compact, and cooling said compact to room temperature thereby forming a product that will withstand a stress of 25,000 p. s. i. at 1500° F. for not less than 100 hours.

5. In the method of producing an alloy product of high relative density, the steps of preparing a mixture of approximately 20% to 35% chromium powder, 35% to 55% cobalt powder, 15% to 50% tungsten powder, and 0.50% to 8.0% carbon powder; pressing said mixture to form a compact of high green strength; heating said compact to an initial sintering temperature below the incipient melting temperature of the compact but not substantially more than 50° C. below; maintaining said compact at substantially said initial sintering temperature for a time sufficient to bond the metals in said compact together; thereafter raising the temperature of said compact to a final sintering temperature not substantially exceeding 30° C. above said incipient melting temperature and between 1150° C. and 1350° C.; maintaining said compact at about said final sintering temperature for a period of time not less than 30 minutes to effect substantially complete alloying of the metals in said compact and to allow for substantial completion of shrinkage of said compact while still maintaining the approximate physical configuration of said compact; and cooling said compact to room temperature.

References Cited in the file of this patent

UNITED STATES PATENTS

| | | |
|---|---|---|
| 2,213,208 | De Golyer | Sept. 3, 1940 |
| 2,342,799 | Goetzel | Feb. 29, 1944 |
| 2,411,073 | Whitney | Nov. 12, 1946 |
| 2,469,718 | Edlund et al. | May 10, 1949 |